United States Patent
Khamesra et al.

(10) Patent No.: US 12,451,814 B2
(45) Date of Patent: Oct. 21, 2025

(54) NSN DETECTION IN PRIMARY-SIDE-CONTROLLED AC-DC CONVERTER

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 193 days.

(21) Appl. No.: 18/353,753

(22) Filed: Jul. 17, 2023

(65) Prior Publication Data

US 2024/0283370 A1 Aug. 22, 2024

(30) Foreign Application Priority Data

Feb. 22, 2023 (IN) .............................. 202311011905

(51) Int. Cl.
*H02M 3/335* (2006.01)
*H02M 1/08* (2006.01)
*H02M 7/217* (2006.01)

(52) U.S. Cl.
CPC ......... *H02M 3/33592* (2013.01); *H02M 1/08* (2013.01); *H02M 3/33523* (2013.01); *H02M 7/217* (2013.01)

(58) Field of Classification Search
CPC ............. H02M 3/335; H02M 3/33523; H02M 3/33592; H02M 7/217; H02M 1/08
See application file for complete search history.

(56) References Cited

U.S. PATENT DOCUMENTS

| | | | |
|---|---|---|---|
| 10,615,700 B1 * | 4/2020 | Moon | H02M 3/3376 |
| 2020/0036280 A1 * | 1/2020 | Yang | H02M 3/33592 |
| 2023/0155516 A1 * | 5/2023 | Mednik | H02M 1/342 363/21.06 |

OTHER PUBLICATIONS

"Secondary Side Synchronous Rectification Switcher", Diodes Incorporated, Jun. 2015, 13 pages.
(Continued)

*Primary Examiner* — Gary L Laxton (57) ABSTRACT

An AC-DC converter and method of operating the same is provided to sense negative voltage (NSN) on a synchronous rectifier (SR_DRAIN) on a secondary-side of the converter. The SR_DRAIN voltage is sensed and a first integration signal (volt-sec) generated based on a time and voltage for which the SR_DRAIN voltage is greater than a bus voltage ($V_{BUS\_IN}$) output from the secondary. When Volt-sec is greater than a reference voltage a volt-sec based NSN detect signal is generated. A second integration signal (integ_resetb) is generated based on the time for which the SR_DRAIN voltage is greater than $V_{BUS\_IN}$. A pulse width of integ_resetb is determined using a counter, and, when it exceeds a reference by a predetermined percentage, a counter-expiry signal is generated. The volt-sec based NSN detect signal and the counter-expiry signal are logically combined to generate a real NSN detect signal when one or both are present.

20 Claims, 7 Drawing Sheets

(56) References Cited

OTHER PUBLICATIONS

"USB PD power adapter secondary side controller", Infineon Technologies AG, Jun. 16, 2022, 31 pages.
"FAN6224: Synchronous Rectification Controller for Flyback and Forward Freewheeling Rectification", Fairchild Semiconductor Corporation, 2013, 21 pages.
"UCC24630 Synchronous Rectifier Controller With Ultra-Low-Standby Current," Texas Instruments, Mar. 2015, pp. 1-41; 41 pages.

* cited by examiner

NSN DETECTION IN PRIMARY-SIDE-CONTROLLED AC-DC CONVERTER

CROSS-REFERENCE TO RELATED APPLICATIONS

This application is claims the benefit of priority under 35 U.S.C. § 119 to India Provisional Patent Application Ser. No. 202311011905, filed in India on Feb. 22, 2023, which is incorporated by reference herein in its entirety.

TECHNICAL FIELD

This disclosure relates generally to AC-DC converters, and more particularly to those including primary-side-controlled AC-DC converters including negative-sensing (NSN) threshold detection for controlling a synchronous rectifier (SR) on a secondary-side of the converter and methods of operating the same.

BACKGROUND

Switch-mode power supplies (SMPSs) or converters are used to convert power from an alternating current (AC) source to a direct current (DC) output at a specified voltage level. One type of SMPS widely utilized in portable consumer, industrial and medical applications is a primary-side-controlled (PSC) AC-DC flyback converter.

Figure 1A:
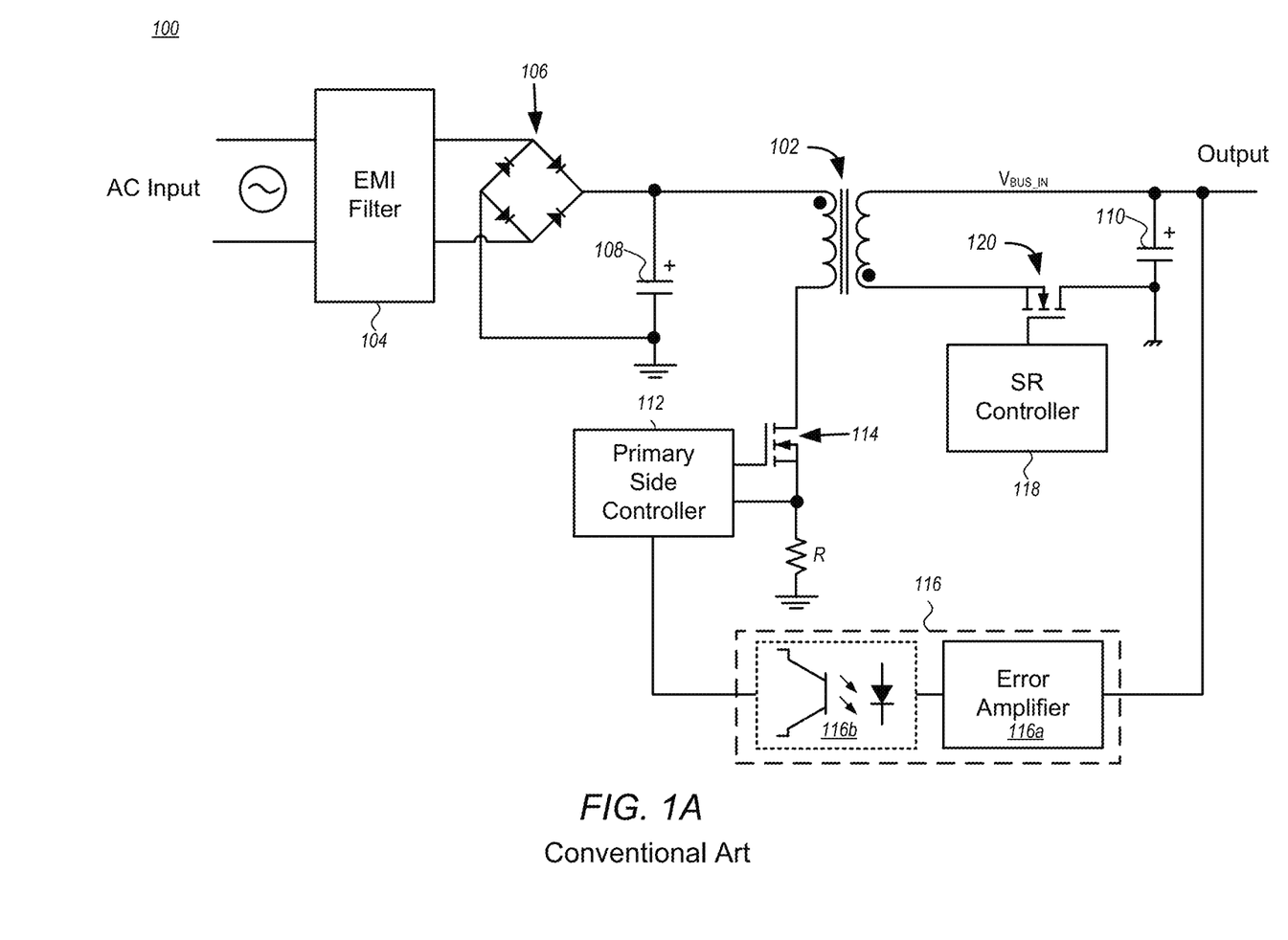
FIG. 1A is a schematic block diagram illustrating a conventional primary-side-controlled (PSC) AC-DC converter, FIG. 1B graphically illustrates a synchronous rectifier (SR_DRAIN, which is drain node of SR_FET) voltage, an integration of SR_DRAIN voltage, and a resulting negative-sensing (NSN) threshold detection for the AC-DC converter of FIG. 1A at a high and a low line input voltages.

Referring to FIG. 1A, a PSC AC-DC converter 100 generally includes a transformer 102 having a primary-side electrically coupled to an AC input through an electromagnetic interference filter (EMI) filter 104 and a rectifying circuit, such as a bridge rectifier 106, and one or more input filter capacitors 108, and a secondary-side coupled to a DC output through one or more output capacitors 110. On the primary-side of transformer 102, a primary controller 112 controls a power switch (PS), such as PS field effect transistor (PS_FET) 114 to switch power to the primary-side on or off in response to a feedback (FB) signal received from the secondary-side through an electrical isolation circuit 116 (e.g., such as error-amplifier 116a followed by an optocoupler 116b). On the secondary-side, synchronous rectifier (SR) controller 118 senses voltage on the secondary-side and turns a synchronous rectifier, such as SR field effect transistor (SR_FET) 120 on and off in response to sensed voltage (on source node of high side SR_FET or drain node of low side SR_FET) negative voltages and zero-crossings.

In operation of PSC AC-DC converter 100, during the time in which the PS_FET 114 is on or closed the SR_FET 120 is off or open, and the PSC AC-DC converter is said to be operating in flyback mode, and a magnetic field builds up in transformer 102 while a current on the primary-side increases linearly. When the PS_FET 114 is off or opened, and SR_FET 120 is on or closed, PSC AC-DC converter 100 transfers the power to secondary-side, and the magnetic field begins to collapse while the secondary-side current decreases steadily, but gradually as power is given to output capacitor 110 until a point is reached at which there is substantially zero current flow in the secondary-side.

Generally, converters such as PSC AC-DC converter 100 can operate in one of two modes, depending on the power drawn from the DC output and the resultant ON-OFF cycle of PS_FET 114. If PS_FET 114 switches from OFF to ON before transformer 102 is completely discharged, the current in the primary-side of the transformer does not start with zero current. This mode of operation is called continuous conduction mode (CCM). Alternately, if the off time of PS_FET 114 lasts long enough for the primary-side of transformer 102 to completely discharge, then the primary-side current starts from zero current when PS_FET 114 switches from OFF to ON. This mode of operation is called discontinuous conduction mode (DCM).

A problem for AC-DC converters operating in DCM mode is false negative sense (NSN) detection. False NSN detection happens when resonant ringing on the primary-side of the converter when both PS_FET and SR_FET are off, is wrongly interpreted by the SR-controller as a signal to turn on the SR field-effect transistor (SR_FET) to transfer power to the secondary-side. This mis-triggering of SR_FET can result in efficiency loss due to additional switching or it can cause cross-conduction if primary-side FET (PS_FET) also turns on at same time. This cross-conduction may cause very high secondary-side current that can cause breakdown of secondary-side transistors and diodes.

Figure 1B:
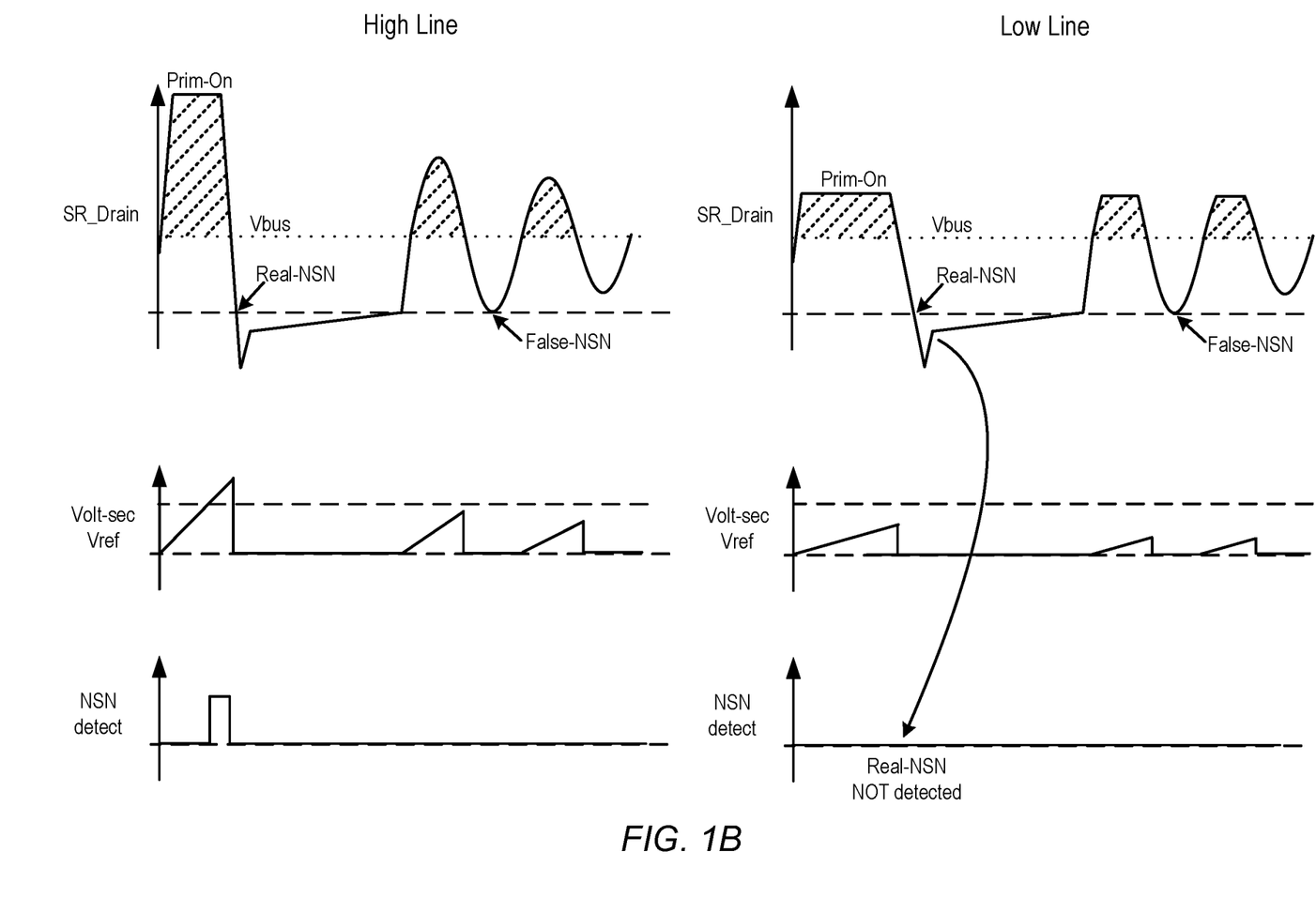

Another related problem for some implementations of PSC AC-DC converters is failure to detect real NSN events. For example, referring to FIGS. 1A and 1B, when transformer 102 has high primary-to-secondary turn-ratio (N:1), at low input line voltage ($V_{IN}$) (e.g., 90V, or below) as shown in right hand side of FIG. 1B, the drain node voltage (SR_DRAIN) of SR_FET 120 will get clipped at $V_{BUS\_IN}$+ $V_{IN}$/N level (where $V_{IN}$ is the rectified AC input line voltage and $V_{BUS\_IN}$ is the DC output voltage). This results in non-detection of a real NSN event even for a very wide primary-side turn-on pulse, thereby resulting in efficiency loss. An example of such non-detection of real NSN event is illustrated in FIG. 1B. At high input line voltage ($V_{IN}$), when the SR_DRAIN voltage drops below 0V (or below another pre-set voltage threshold), the SR controller detects the real NSN event (as evidenced by a pulse on the real-NSN detect signal) since the SR_DRAIN voltage is well above the $V_{BUS\_IN}$ level. However, at low input line voltage, the SR_DRAIN voltage is clipped closer to the $V_{BUS\_IN}$ level and as a result the SR controller does not detect the real NSN event (as evidenced by the lack of pulse on the real-NSN detect signal).

Accordingly, there is a need for an AC-DC converter including a NSN detection circuit and method of operating the same to detect real NSN events when operating with both high and low input line voltages. It is further desirable that the detector and method not erroneously detect or signal false NSN events.

SUMMARY

An AC-DC converter and method of operating the same is provided to sense a negative voltage (NSN) on a sensing voltage (SR_DRAIN voltage) on a drain node of a synchronous rectifier (SR) in a secondary-side of the AC-DC converter independent of a line input voltage and without signal from a primary-controller. The method begins while operating the AC-DC converter in a discontinuous conduction mode with a power switch (PS) in a primary-side of the AC-DX converter ON and the SR OFF. The SR_DRAIN voltage is sensed and a first integration performed to generate a first integration (volt-sec) signal based on a time and voltage for which the SR_DRAIN voltage is greater than a bus output voltage ($V_{BUS\_IN}$) output from the secondary-side of the AC-DC converter. Simultaneously, a second method is performed to generate a second (integ_resetb) signal having a pulse width based on or corresponding to the time for which the SR_DRAIN voltage is greater than $V_{BUS\_IN}$. The volt-sec signal is then compared to a reference voltage (Vref), and, when volt-sec is greater than Vref, a volt-sec based NSN detect signal is generated. The pulse width of the integ_resetb signal is determined or measured using a counter in the SR-controller, and, when the pulse width exceeds a reference pulse width by greater than a predetermined percentage, a counter-expiry signal is generated. Finally, the volt-sec based NSN detect signal and the counter-expiry signal are logically combined to generate a combined or real NSN detect signal when one or both of the volt-sec based NSN detect signal and the counter-expiry signal are present. The combined or real NSN detect signal can then be coupled to a SR gate driver in the SR-controller to turn on SR, as early as possible after the PS turning OFF, thereby improving efficiency of the AC-DC converter, especially for higher output power.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A primary-side-controlled (PSC) AC-DC converter and method of operating the same for sensing a negative-sensing (NSN) threshold on a drain node (SR_DRAIN) of a synchronous rectifier (SR) on a secondary-side of the AC-DC converter a SR_DRAIN voltage greater than a bus voltage ($V_{BUS\_IN}$) output from the AC-DC converter are provided. The AC-DC converter an method are capable of sensing the NSN threshold in a SR-controller independent of a rectified AC input line voltage, and without signal from a primary-controller.

Briefly, the method begins while operating the AC-DC converter in a discontinuous conduction mode with a power switch (PS) in a primary-side of the AC-DC converter ON and the SR OFF, with sensing on a drain node (SR_DRAIN) of a synchronous rectifier (SR) on a secondary-side of the AC-DC converter a SR_DRAIN voltage greater than a bus voltage ($V_{BUS\_IN}$) output from secondary side of the AC-DC converter. A first integration of the SR_DRAIN voltage is performed using an integrator in a SR-controller to generate a first integration signal (volt-sec) based on a time and voltage for which the SR_DRAIN voltage is greater than $V_{BUS\_IN}$. Simultaneously or concurrently, a second method is performed to generate a second integration signal or integration reset bar signal (integ_resetb) having a pulse width based on or corresponding to the time for which the SR_DRAIN voltage is greater than $V_{BUS\_IN}$ output from the secondary-side of the AC-DC converter. The vol-sec signal is then compared to a reference voltage (Vref), and, when volt-sec is greater than Vref, a volt-sec based NSN detect signal is generated. Simultaneously or concurrently, the pulse width of the integ_resetb signal is determined or measured using a counter in the SR-controller, and, when the pulse width exceeds a reference pulse width by greater than a predetermined percentage, a counter-expiry signal is generated. Finally, the volt-sec based NSN detect signal and the counter-expiry signal are logically combined using a logic gate or circuit to generate a combined or real NSN detect signal when one or both of the volt-sec based NSN detect signal and the counter-expiry signal are present. The combined or real NSN detect signal may then be coupled to a SR gate driver in the SR-controller to turn on SR, as early as possible after the PS turning OFF, thereby improving efficiency of the AC-DC converter, particularly when the AC-DC converter is operated at higher output powers.

The PSC AC-DC converter and methods will now be described in greater detail with reference to FIGS. 2A through 4. In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

Figure 2A:
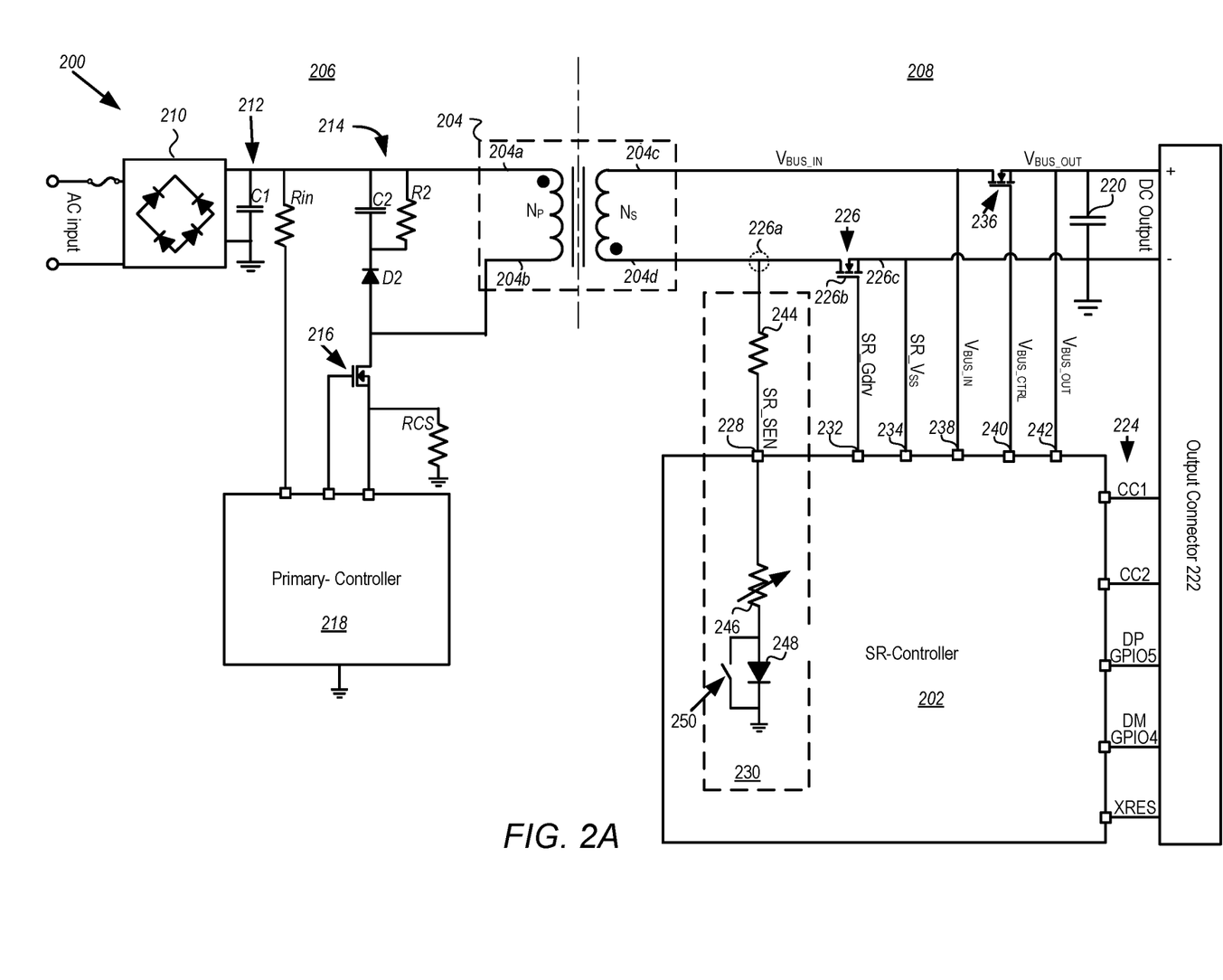
FIG. 2A is a schematic block diagram illustrating a PSC AC-DC converter operable to differentiate between false and real NSN events in accordance with techniques and embodiments described herein.

FIG. 2A is a schematic block diagram illustrating a PSC AC-DC converter operable to differentiate between false and real NSN events in accordance with techniques and embodiments described herein;

An embodiment of a PSC AC-DC converter including a SR-controller operable to sense a negative sensing (NSN) threshold independent of line input voltage or signals from a primary-controller according to the present disclosure will now be described with reference to FIGS. 2A through 2C.

FIG. 2A is a simplified schematic block diagram of an embodiment of the AC-DC converter 200 and includes a SR-controller 202, a transformer 204 having a primary-winding (NP) on a primary side 206 electrically connected or coupled to an AC input, and a secondary-winding (NS) on a secondary side 208 coupled to a DC output.

On the primary side 206 a rectifying circuit, such as a bridge rectifier 210, and one or more input filters, coupled to a first terminal 204a of the transformer 204 rectify an AC input voltage and supply input power to the primary-winding of the transformer 204. The input filters can include a first input filter 212 having a capacitor (C1) coupled to or across an output of the rectifier 210, and a snubber 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. The parasitic capacitance due to D2, PS 216 and transformer 204 and the inductor of primary-winding of the transformer 204 form an inductor-capacitor (LC) circuit, which generates an LC resonance ringing and a corresponding ringing in a SR_DRAIN voltage on the SR_DRAIN node 226a. The frequency of this LC resonance can be determined either by calibration at an initial power up of the AC-DC converter 200, or by calculations performed by a system designer, and is used to determine the reference pulse width and the predetermined percentage used to generate the counter-expiry signal.

The AC-DC converter 200 further includes a power switch (PS 216), such as a primary field effect transistor (PR_FET), having a first or drain node coupled to the second terminal 204b of the transformer 204, a second or gate node coupled to a primary-side-controller 218, and a third or source node coupled to the primary-side-controller and, through a current sensing element, such as a resistive element (RCS) to ground to sense a primary side current (I_primary) flowing through the primary-winding when the PS 216 is closed or conducting. Generally, as in the embodiment shown, the primary-side-controller 218 is further coupled to the first terminal 204a of the transformer 204 through a resistive element (Rin) to receive a voltage or signal equal or proportional to the rectified AC input voltage.

The parasitic capacitance due to D2, PS 216 and transformer 204 and the inductor of primary-winding of the transformer 204 form an inductor-capacitor (LC) circuit, which generates an LC resonance ringing and a corresponding ringing in a SR_DRAIN voltage on the SR_DRAIN node 226a. The frequency of this LC resonance can be determined either by calibration at an initial power up of the AC-DC converter 200, or by calculations performed by a system designer, and is used to determine the reference pulse width and the predetermined percentage used to generate the counter-expiry signal.

On the secondary side 208 the AC-DC converter 200 includes an output capacitor 220 coupled between a third terminal 204c of the transformer 204 and an electrical ground provide a DC output voltage to an output interface or connector 222. Generally, as in the embodiment shown the output connector 222 is further coupled to the SR-controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) connector where the AC-DC converter 200 is compliant with the USB protocol to provide a DC output voltage of about 3.3 VDC to about 21.5 VDC or 28 VDC at a current of from about 0 to about 5000 milliamps (mA).

The AC-DC converter 200 further includes on the secondary side 208 a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the SR-controller 202 to sense a voltage on the drain of the SR; a second or gate node 226b coupled to the SR-controller to drive or control the SR; and a third or source node 226c coupled to the SR-controller and the ground terminal of the DC output.

In certain embodiments, such as that shown, the SR-controller 202 is realized or implemented as single integrated circuit (IC), or as a number of ICs packaged in a single IC package, and the drain node 226a is coupled to a single SR-SEN pin 228 of the IC through a voltage divider 230 including circuit elements both internal and external to the IC of the SR-controller. The gate node 226b of the SR 226 is coupled to the SR-controller 202 through a SR-drive pin 232, and the source node 226c of the SR is coupled to the SR-controller through a SR-Vss (ground voltage level) pin 234.

Optionally, as in the embodiment shown, the secondary side further includes an additional or secondary switch (SS) 236, such as a NFET, coupled between the third terminal 204c of the transformer 204 and a positive DC output to enable to the SR-controller 202 to turn off the DC output to protect against over voltage and/or under voltage conditions. The SS 236 includes a source node coupled to a voltage bus in pin ($V_{BUS\_IN}$ 238) of the SR-controller 202; a gate node coupled to a voltage bus control pin ($V_{BUS\_CTRL}$) 240 to drive or control the SS; and a drain node coupled to a voltage bus out pin ($V_{BUS\_OUT}$ 242) and to the positive terminal of the DC output.

The voltage divider 230 includes an external resistive element 244, an internal resistive element 246 and an internal rectifier 248. Although shown schematically as a diode, it will be understood that this need not be case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR-SEN pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SEN pin 228 to enable the SR-controller 202 to be a made with non-high voltage devices, made using standard, low voltage technologies. Suitable values for the resistance of the resistive element 244 are from about 4 KΩ to about 10 KΩ.

In some embodiments the transformer can include a high primary-to-secondary turn-ratio (N:1), where N is a whole number greater than 1 to step down voltage on the secondary. For example in one embodiment in which the maximum input voltage after bridge rectifier 210 is 380V and the transformer 204 has a 4:1 turn ratio, and the voltage of 21.5V DC on $V_{BUS\_IN}$, the SR_DRAIN 226a voltage can be 116.5V. SR-controller 202 is fabricated using a 20V tolerant technology, and the external resistive element 244 has a resistance of about 10 KΩ and internal resistance of about 2 KΩ to limit the maximum voltage on the drain node 226a to no more than about 21.5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or SR-controller 202, either at start-up or powering on of the AC-DC converter, or periodically thereafter.

Optionally, as in the embodiment shown, the voltage divider 230 further includes a bypass switching element or switch 250 in parallel the internal rectifier 248. The switch 250 is closed during feed-forward (ff) sensing in response to an ff-signal (not shown) generated in the SR-controller 202 upon detection of an increasing or non-zero positive voltage on the drain node 226a, which indicates a feed-forward operation. It is noted that although in the embodiment shown in FIG. 2A the internal rectifier 248 and the switch 250 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

Figure 2B:
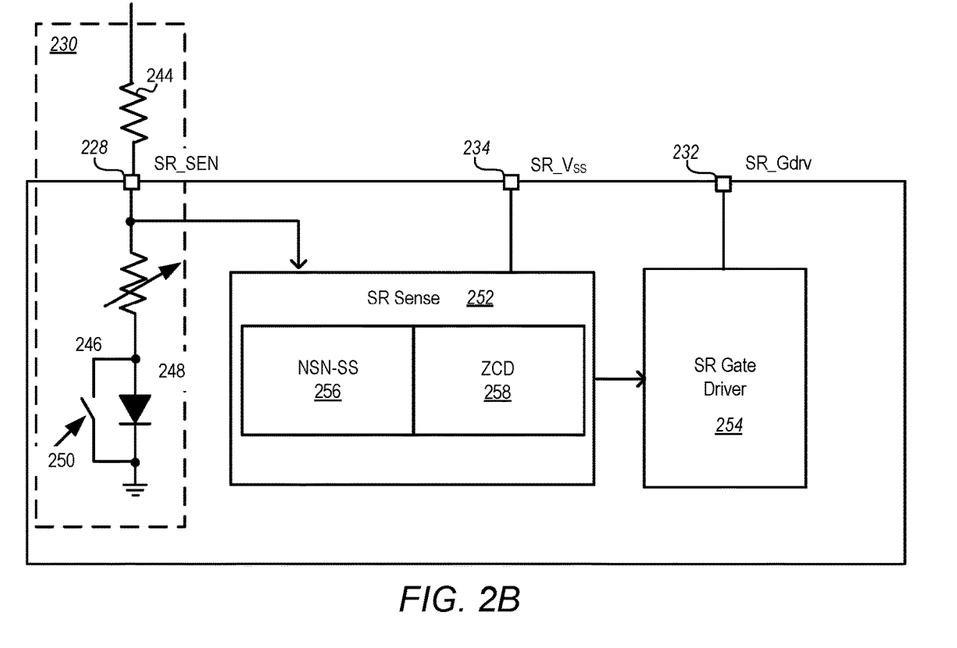
FIG. 2B is a schematic block diagram illustrating an embodiment of the SR-controller of the AC-DC converter of FIG. 2A in accordance with the present disclosure.
Figure 2C:
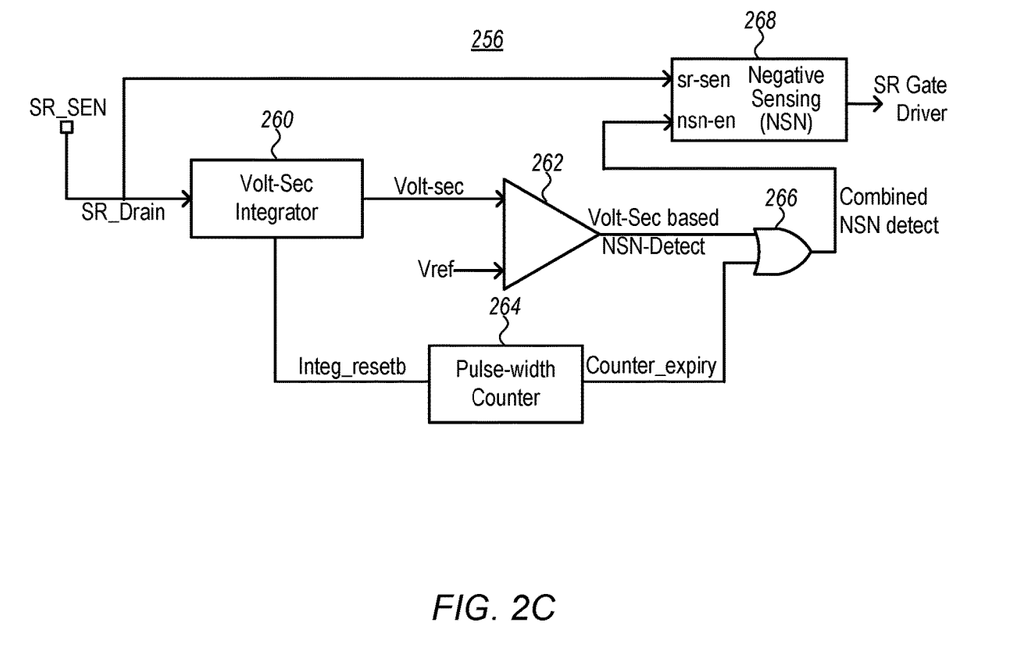
FIG. 2C is a schematic block diagram depicting a NSN-SS circuit including an internal digital counter to determine a pulse-width of a secondary voltage at a resonant frequency and above a $V_{BUS}$ level.

FIG. 2B is a detailed schematic block diagram illustrating an embodiment of the SR-controller of the AC-DC converter of FIG. 2A in accordance with the present disclosure. Referring to FIG. 2B, in addition to the voltage divider 230 the SR-controller 202 generally further includes an SR sense module or block 252 and a SR gate driver 254 coupled to the gate node 226b of the SR 226 through the SR-drive pin 232. The SR sense block 252 is coupled to the drain node 226a of the SR 226 through the single SR-SEN pin 228 and the voltage divider 230 and through the SR-Vss pin 234 to the source node 226c of the SR.

The SR sense block 252 generally includes a negative-sensing threshold subsystem (NSN-SS) circuit 256, and a zero-crossing detector (ZCD) circuit 258. The NSN-SS circuit 256 is configured or operable to sense when a voltage (SR_DRAIN voltage) on the drain 226a of the SR 226 drops to or below a negative voltage following turning OFF of the PS 216, and to signal the SR gate driver 254 to turn ON the SR 226. In accordance with the present disclosure the NSN-SS circuit 256 is operable to quickly signal the SR gate driver 254 to turn ON the SR 226 following detection of a real NSN event, thereby improving efficiency of the AC-DC converter 200 when operating in a discontinuous conduction mode (DCM), especially at higher output power. Additionally, the NSN-SS circuit 256 is further operable to not generate signals for false NSN events, such as those caused by rapid drops in SR_DRAIN voltage that can occur due to LC ringing when both the PS 216 and SR 226 are OFF. The ZCD circuit 258 is configured or operable to detect when a rising SR_DRAIN voltage crosses zero volts.

Generally, the SR-controller 202 further includes a number of interface circuits (not shown) for communicating with the number of communication channels 224, and a microcontroller unit (MCU) or subsystem including logic a microprocessor or controller and memory for executing programs stored memory in the SR-controller 202.

Embodiments of the NSN-SS circuit 256 of the SR sense block 252 of FIG. 2B will now be described with reference to FIG. 2C. Referring to FIG. 2C, the NSN-SS circuit 256 generally includes at least a first integrator (volt-sec integrator 260) a comparator 262, a pulse-width counter 264, a combinational logic element, such as a logic OR gate 266, and a negative sensing (NSN) block 268. The volt-sec integrator 260 is coupled to the SR-SEN pin 228 and is configured or operable to receive a sensed SR_DRAIN voltage and generate a first integration or volt-sec signal based on a time and voltage for which the SR_DRAIN voltage is greater than $V_{BUS\_IN}$; while the PS 216 is ON. This Volt-sec signal is compared with Vref (which is programmable) to generate volt-sec based NSN-detect signal which is combined with counter-expiry signal using a combinational logic element, such as logical OR gate 266. This logical OR gate 266 gives combined NSN detect signal which is used as an enabling signal (nsn_en) for NSN (268) block. The NSN block (268) senses SR_sen signal going negative when PS 216 turns off and gives out a signal to SR Gate driver to enable external SR-FET if nsn_en signal is high.

Figure 2D:
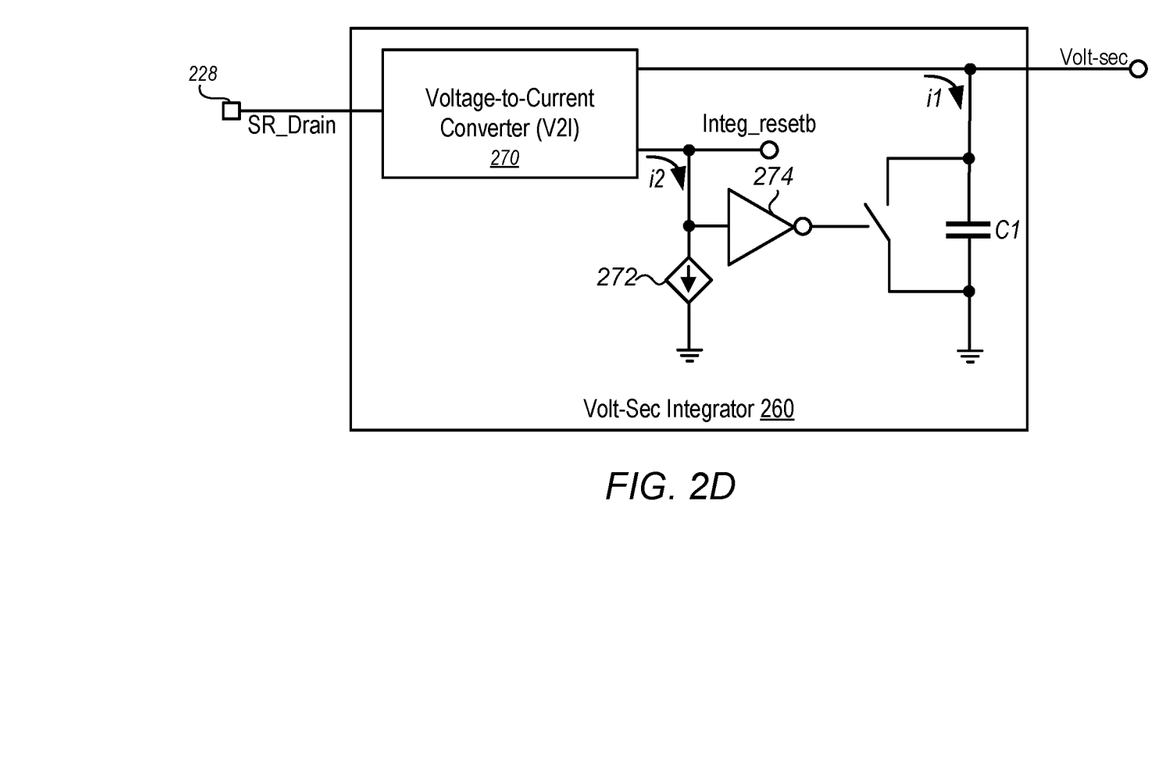
FIG. 2D is a schematic block diagram depicting an embodiment of a volt-sec integrator.

FIG. 2D is a schematic block diagram depicting an embodiment of a volt-sec integrator 260. Generally, the volt-sec integrator 260 can be a voltage-to-current (V2I) converter 270 receiving an input voltage from the SR_SEN pin where the same or a proportional current i1 from the V2I converter is used to charge a capacitor (C1), the output of which is the volt-sec integrated voltage from the volt-sec integrator 260. The voltage used as input of V2I converter 270 is proportional to $V_{BUS\_IN}$ subtracted voltage of SR_DRAIN sensed via SR_SEN pin and $V_{BUS\_IN}$ pin. The V2I converter 270, also generates a second current i2 which is the same or proportional current to SR_DRAIN is compared with a $V_{BUS\_IN}$ based current 272 to generate integ_resetb signal which goes high when SR_DRAIN voltage goes higher than $V_{BUS\_IN}$ and goes low when SR_DRAIN voltage goes lower than $V_{BUS\_IN}$. The same Integ_resetb signal is inverted through inverter 274 and used to discharge (or reset) capacitor C1 whenever SR_DRAIN voltage is lower than $V_{BUS\_IN}$, which in-turn resets volt-sec voltage.

The comparator 262 is generally implemented using a differential operational amplifier or OPAMP, and is configured or operable to receive the volt-sec signal from the volt-sec integrator 260, compare it to a predefine reference voltage (Vref) programmable using software and determined based on AC-DC board level components, and output a volt-sec based negative voltage sensed (NSN) detect signal to the combinational logic element (logic OR gate 266).

The pulse-width counter 264 is configured or operable to receive an integ_resetb signal from the volt-sec integrator 260, determine or measure the pulse width of the integ_resetb signal, and if the pulse width of the integ_resetb signal is more than a predetermined percentage greater than a reference pulse width, generating a counter-expiry signal, which is coupled to the combinational logic element (logic OR gate 266). Generally, the pulse-width counter 264 determines if the pulse width of the integ_resetb signal is more than a predetermined percentage greater than a reference pulse width by counting at a fixed rate for the time in which the integ_resetb signal is present or high, comparing the resultant count to a stored count or representing a value of 1·X times the count for a previously determined reference pulse width, where X is the predetermined percentage.

The combinational logic element, such as an logic OR gate 266, is configured or operable to receive the volt-sec based NSN detect signal and the counter-expiry signal and to generate and couple a combined NSN detect signal which is then used as enable signal for negative-sensing (NSN) block to sense real NSN event which is then driven to the SR gate driver 254 when one or both of the volt-sec based NSN detect signal and the counter-expiry signal are present.

The negative sensing (NSN) block 268 generally includes a comparator which senses SR_sen signal going negative when PS 216 turns off and gives out a signal to SR Gate driver to enable external SR-FET if nsn_en signal is high.

Optionally, in other embodiments the NSN-SS circuit 256 can include a second integrator (not shown) coupled between the volt-sec integrator 260 and the pulse-width counter 264, or between the SR-SEN pin 228 and the pulse-width counter in parallel with the volt-sec integrator, and operable to generate the integ_resetb signal.

Figure 3:
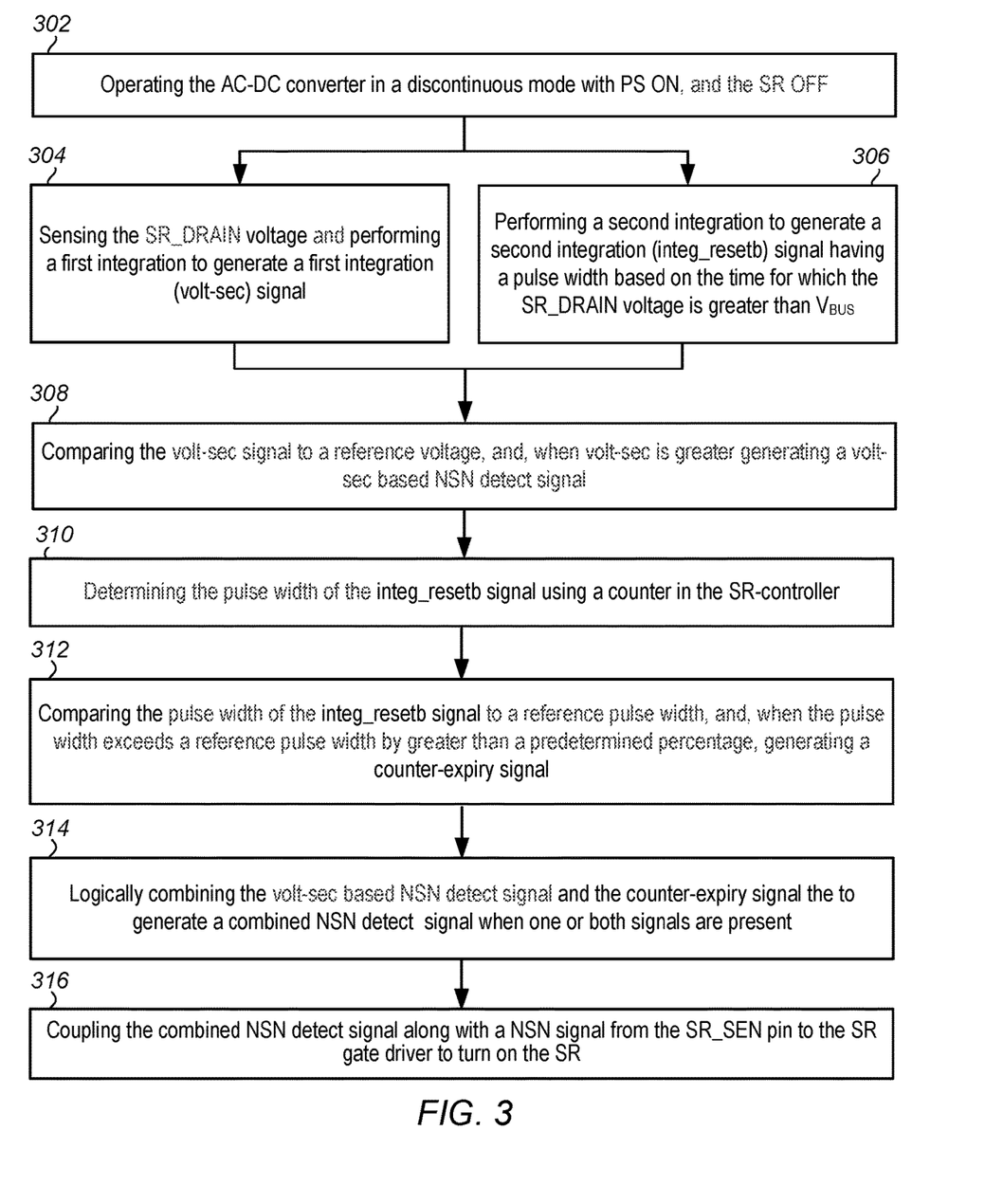
FIG. 3 is a flowchart illustrating a method for operating the PSC AC-DC converter shown in FIGS. 2A through 2C.

A method for operating a primary-side-controlled AC-DC converter including a SR-controller 202 with NSN-SS circuit 256 as described above to independent of a line input voltage and without receiving a signal from a primary-controller 218, will now be described with reference to FIGS. 3 and 4, where FIG. 3 is a flowchart illustrating the method, and FIG. 4 graphically illustrates a SR_DRAIN voltage, an integration of SR_DRAIN voltage, an integration reset bar signal, and a resulting NSN threshold detection at high and low line input voltages.

Figure 4:
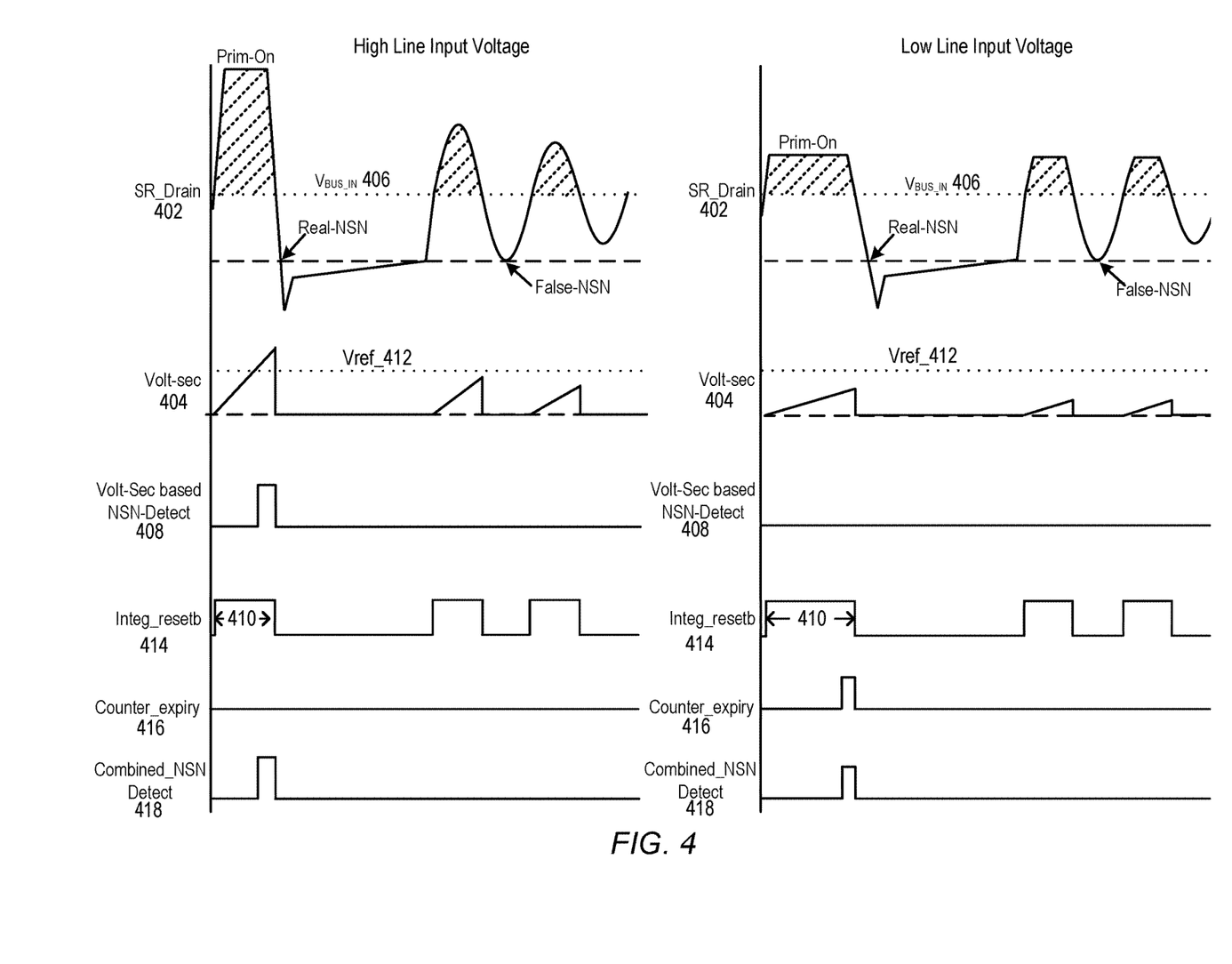
FIG. 4 graphically illustrates a SR_DRAIN voltage, a first integration of SR_DRAIN voltage, a second signal and a resulting NSN threshold detection at high and low line input voltages for the AC-DC converter shown in FIGS. 2A through 2C.

Referring to FIGS. 3 and 4 the method begins while operating the AC-DC converter in a discontinuous mode (DCM) with the power switch (PS 216) in the primary-side 206 of the AC-DC converter 200 ON, and the SR 226 OFF (step 302). A SR_DRAIN voltage 402 is then sensed and a first integration performed to generate a first integration (volt-sec 404) signal based on a time and voltage for which the SR_DRAIN voltage is greater than a bus voltage ($V_{BUS\_IN}$ 406) on the secondary-side 208 of the AC-DC converter 200 (step 304). Concurrently, or substantially simultaneously, a second integration is performed to generate a second integration signal (integ_resetb 414) having a pulse width (PW 410) based on or corresponding to the time for which the SR_DRAIN voltage 402 is greater than $V_{BUS\_IN}$ 406 (step 306). The volt-sec signal 404 is then compared to a reference voltage (Vref 412), and, when volt-sec is greater than Vref, a volt-sec based NSN detect signal 408 is generated (step 308). The pulse width of the integ_resetb signal 414 is determined or measured using a counter 264 in the SR-controller 202 (step 310), and, when the pulse width exceeds a reference pulse width (not shown) by greater than a predetermined percentage, a counter-expiry 416 signal is generated (step 312). The volt-sec based NSN detect signal 408 and the counter-expiry 416 signal are logically combined to generate a combined or real NSN detect signal 418 when one or both of the volt-sec based NSN detect signal and the counter-expiry signal are present (step 314). Finally, the combined NSN detect signal 418 along with a negative-sensing (NSN) voltage or signal (sr-sen in FIG. 2C) from the SR_SEN pin are coupled through the NSN block 268 as shown in FIG. 2C, and a gate drive signal is then coupled to the SR gate driver 254 in the SR-controller 202 to turn on SR 226 after turning OFF the PS 216 (step 316), thereby improving efficiency of the AC-DC converter 200, especially at higher output power.

The left hand side of FIG. 4 illustrates a first situation or operational context where the AC input line voltage is high, and the volt-sec signal 404 is greater than Vref 412 generating a volt-sec based NSN detect signal 408 and combined NSN detect signal 418, even though the pulse width 410 of the integ_resetb signal 414 is not more than a predetermined percentage greater than a reference pulse width.

The right hand side of FIG. 4 illustrates another operational context where due to a high primary to secondary turns ratio and/or a low AC input line voltage, the SR_DRAIN voltage 402 is clipped, and the volt-sec signal 404 is less than Vref 412 resulting in a volt-sec based NSN detect signal 408 not being generated, but wherein the pulse width 410 of the integ_resetb signal 414 is more than a predetermined percentage greater than a reference pulse width, resulting in a counter-expiry signal 416 and a combined NSN detect signal 418 being generated, and the SR 226 being turned ON upon detection of a real-NSN event.

It is noted that in both of the above operational contexts, the steadily diminishing ringing in the SR_DRAIN voltage 402 produced by the LC circuit in the primary-side 206 does not result in either a volt-sec signal 404 that is greater than Vref 412, or a integ_resetb signal 414 having a pulse width 410 more than a predetermined percentage greater than the reference pulse width so a false-NSN event is not detected and a combined NSN detect signal 418 is not generated.

Generally, the reference pulse width is determined or based on the frequency of this LC resonance ringing produced in the LC circuit formed by the parasitic capacitor due to D2, PS 216 and transformer 204 and the inductor of primary-winding of the transformer 204. As noted above, the frequency of this LC resonance ringing can be determined either by calibration at an initial power up of the AC-DC converter 200, or by calculations performed by a system designer, and is used to determine the reference pulse width and the predetermined percentage used to generate the counter-expiry signal. Generally, the predetermined percentage by which the pulse width of the integ_resetb signal 414 must be greater than the reference pulse width to generate the counter-expiry 416 signal is higher than about 100% of the pulse-width of LC resonant waveform at $V_{BUS\_IN}$ level. For example, the reference pulse width can be about. 150% of the pulse-width of LC resonant waveform at $V_{BUS\_IN}$ level. This additional margin is desirable to account for changes in LC resonant frequency arising from changes in AC input line voltages, and board-to-board variations components used to fabricate the of the AC-DC converter 200.

Thus, a primary-side-controlled AC-DC converter and methods of operating the same to sense an NSN threshold in a SR-controller independent of a rectified AC input line voltage, and without signal from a primary-controller have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method of operating an AC-DC converter, the method comprising:
    sensing on a drain node of a synchronous rectifier (SR) on a secondary-side of the AC-DC converter a SR_DRAIN voltage greater than a bus voltage ($V_{BUS\_IN}$) output from the AC-DC converter;
    generating a first integration (volt-sec) signal based on a time and voltage for which the SR_DRAIN voltage is greater than $V_{BUS\_IN}$;
    generating a second integration (integ_resetb) signal having a pulse width based on the time for which the SR_DRAIN voltage is greater than $V_{BUS\_IN}$ output from the secondary-side of the AC-DC converter;
    comparing the volt-sec to a reference voltage (Vref), and when volt-sec is greater than Vref, generating a volt-sec based negative voltage sensed (NSN) detect signal;
    determining the pulse width of the integ_resetb signal using a counter and when pulse width exceeds a reference pulse width by greater than a predetermined percentage, generating a counter-expiry signal; and
    logically combining the volt-sec based NSN detect signal and the counter-expiry signal to generate a combined NSN detect signal when one or both of the volt-sec based NSN detect signal and the counter-expiry signal are present.

2. The method of claim 1, further comprising coupling the combined NSN detect signal to a SR gate driver to turn on the SR.

3. The method of claim 2 wherein turning on the SR due to the SR_DRAIN voltage dropping to a negative voltage followed by a gradual rise in SR_DRAIN voltage, and further comprising turning off the SR when a rising SR_DRAIN voltage crosses zero volts.

4. The method of claim 3 further comprising cycling a power switch (PS) in a primary-side of the AC-DC converter on and off to couple an input line voltage to a primary-winding of a transformer in the AC-DC,
    wherein the SR_DRAIN voltage is received when the power switch is on, and
    wherein after turning off the SR, when both the PS and the SR are off an inductor-capacitor (LC) circuit formed by the primary-winding, PS and a snubber in the primary-side generates an LC ringing in the SR_DRAIN voltage.

5. The method of claim 4 wherein Vref is selected so that the volt-sec generated by integration of the SR_DRAIN voltage in response to the LC ringing is less than Vref and the volt-sec based NSN detect signal is not generated.

6. The method of claim 4 wherein the reference pulse width is selected so that the pulse width of the integ_resetb signal generated in response to the LC ringing of the SR_DRAIN voltage less than reference pulse width, and the counter-expiry signal and resultant NSN detect signal are not generated.

7. The method of claim 4 wherein when the transformer has a high primary-to-secondary turn-ratio and the input line voltage is low, the SR_DRAIN voltage is clipped so that the volt-sec based NSN detect signal is not generated, and the pulse width of the integ_resetb signal exceeds the reference pulse width by greater than the predetermined percentage, generating the counter-expiry signal and the combined NSN detect signal.

8. A method of operating an AC-DC converter comprising:
    sensing on a drain node of a synchronous rectifier (SR) on a secondary-side of the AC-DC converter a SR_DRAIN voltage greater than a bus voltage ($V_{BUS\_IN}$) output from the AC-DC converter;
    integrating the SR_DRAIN voltage to generate a volt-sec signal based on a time and voltage for which the SR_DRAIN voltage is greater than $V_{BUS\_IN}$;
    generating an integration reset bar signal (integ_resetb) having a pulse width based on the time for which the SR_DRAIN voltage is greater than $V_{BUS\_IN}$;
    determining the pulse width of the integ_resetb signal using a counter, and, when the pulse width exceeds a reference pulse width by greater than a predetermined percentage, generating a counter-expiry signal; and
    generating and coupling a negative voltage sensed (NSN) detect signal to a SR gate driver to turn on the SR when the counter-expiry signal is present.

9. The method of claim 8, further comprising comparing the volt-sec to a reference voltage (Vref), and when volt-sec is greater than Vref, generating a volt-sec based NSN detect signal, and wherein generating and coupling the NSN detect signal to the SR gate driver comprises logically combining the volt-sec based NSN detect signal with the counter-expiry signal, and generating and coupling the NSN detect signal to the SR gate driver when one or both of the volt-sec based NSN detect signal and the counter-expiry signal are present.

10. The method of claim 9 wherein turning on the SR due to the SR_DRAIN voltage dropping to a negative voltage followed by a gradual rise in SR_DRAIN voltage, and further comprising turning off the SR when the SR_DRAIN voltage crosses zero volts.

11. The method of claim 10 further comprising cycling a power switch (PS) in a primary-side of the AC-DC converter on and off to couple an input line voltage to a primary-winding of a transformer in the AC-DC, wherein the SR_DRAIN voltage is received when the power switch is on, and wherein after turning off the SR, when both the PS and the SR are off an inductor-capacitor (LC) circuit formed by the primary-winding, PS and a snubber in the primary-side produces an LC ringing in the SR_DRAIN voltage.

12. The method of claim 11 wherein Vref is selected so that the volt-sec generated by integration of the SR_DRAIN voltage in response to the LC ringing is less than Vref and the volt-sec based NSN detect signal is not generated.

13. The method of claim 11 wherein the reference pulse width is selected so that the pulse width of the integ_resetb signal generated in response to the LC ringing of the SR_DRAIN voltage less than reference pulse width, and the counter-expiry signal and resultant NSN detect signal are not generated.

14. The method of claim 11 wherein when the transformer has a high primary-to-secondary turn-ratio and the input line voltage is low, the SR_DRAIN voltage is clipped so that the volt-sec based NSN detect signal is not generated, and the pulse width of the integ_resetb signal exceeds the reference pulse width by greater than the predetermined percentage, generating the counter-expiry signal and the NSN detect signal.

15. An AC-DC converter comprising:
    a transformer including a primary-winding coupled to a rectified AC input line voltage through a power switch (PS) and a secondary-winding coupled to a DC output and to a ground terminal through a synchronous rectifier (SR), the SR having a drain node (SR_DRAIN) coupled to the secondary-winding and a source node coupled to the ground terminal, wherein the DC output provides a bus voltage ($V_{BUS\_IN}$) output;

a primary-controller coupled to control the PS; and a SR-controller coupled to control the SR, wherein the SR-controller is operable to:

generate a first integration (volt-sec) signal based on a time and voltage for which a SR_DRAIN voltage is greater than $V_{BUS\_IN}$;

generate a second integration (integ_resetb) signal based on the time for which the SR_DRAIN voltage is greater than $V_{BUS\_IN}$ output from a secondary-side of the AC-DC converter;

compare the volt-sec to a reference voltage (Vref), and when volt-sec is greater than Vref, generate a volt-sec based negative voltage sensed (NSN) detect signal;

determine a pulse width of the integ_resetb signal using a counter and when pulse width exceeds a reference pulse width by greater than a predetermined percentage, generate a counter-expiry signal; and logically combine the volt-sec based NSN detect signal and the counter-expiry signal to generate a combined NSN detect signal when one or both of the volt-sec based NSN detect signal and the counter-expiry signal are present.

16. The AC-DC converter of claim 15, wherein the SR-controller further comprises a SR gate driver to turn on and off the SR, and wherein the SR-controller is operable to couple the combined NSN detect signal to the SR gate driver to turn on the SR.

17. The AC-DC converter of claim 16, wherein after turning off the SR, when both the PS and the SR are off an inductor-capacitor (LC) circuit formed by the primary-winding, PS and a snubber in a primary-side of the AC-DC converter produces an LC ringing in the SR_DRAIN voltage, and wherein Vref is selected so that the volt-sec generated by integration of the SR_DRAIN voltage in response to the LC ringing is less than Vref and the volt-sec based NSN detect signal is not generated.

18. The AC-DC converter of claim 15, wherein the transformer has a high primary-to-secondary turn-ratio so that when the rectified AC input is low the SR_DRAIN voltage is clipped and the volt-sec based NSN detect signal is not generated, and the SR-controller is operable so that the pulse width of the integ_resetb signal exceeds the reference pulse width by greater than the predetermined percentage, generating the counter-expiry signal and the combined NSN detect signal.

19. The AC-DC converter of claim 15, wherein the AC-DC converter is compliant with a Universal Serial Bus Power Delivery (USB-PD) specification.

20. The AC-DC converter of claim 15, further comprising a Universal Serial Bus Type-C (USB-C) connector coupled to the DC output to receive the $V_{BUS\_OUT}$ voltage.

* * * * *